United States Patent
Steele et al.

(10) Patent No.: US 9,789,744 B2
(45) Date of Patent: Oct. 17, 2017

(54) TRANSPORT REFRIGERATION SYSTEM UTILIZING ENGINE WASTE HEAT

(75) Inventors: John T. Steele, Marcellus, NY (US); Benjamin E. Ferguson, Cazenovia, NY (US)

(73) Assignee: CARRIER CORPORATION, Farmington, CT (US)

( * ) Notice: Subject to any disclaimer, the term of this patent is extended or adjusted under 35 U.S.C. 154(b) by 540 days.

(21) Appl. No.: 14/346,009

(22) PCT Filed: Sep. 7, 2012

(86) PCT No.: PCT/US2012/054107
§ 371 (c)(1),
(2), (4) Date: Mar. 20, 2014

(87) PCT Pub. No.: WO2013/043389
PCT Pub. Date: Mar. 28, 2013

(65) Prior Publication Data
US 2014/0223933 A1    Aug. 14, 2014

Related U.S. Application Data

(60) Provisional application No. 61/538,295, filed on Sep. 23, 2011.

(51) Int. Cl.
*F25B 7/00* (2006.01)
*B60H 1/00* (2006.01)
(Continued)

(52) U.S. Cl.
CPC ....... *B60H 1/00014* (2013.01); *B60H 1/0045* (2013.01); *B60H 1/00378* (2013.01);
(Continued)

(58) Field of Classification Search
CPC .............. B60H 1/00014; B60H 1/0045; B60H 1/00378; B60H 1/3232; F25B 27/02; F25B 47/02
See application file for complete search history.

(56) References Cited

U.S. PATENT DOCUMENTS 3,658,244 A * 4/1972 Caldwell ............ B60H 1/00814
236/37
4,270,365 A    6/1981 Sampietro
(Continued)

FOREIGN PATENT DOCUMENTS

CN    2888360       4/2007
EP    1628091 A2    2/2006
(Continued)

OTHER PUBLICATIONS

International Search Report; PCT/US2012/054107 and Written Opinion of the International Searching Authority; date of mailing Feb. 11, 2013.
International Preliminary Report on Patentability; date of mailing Apr. 3, 2014.

*Primary Examiner* — David Teitelbaum
(74) *Attorney, Agent, or Firm* — Cantor Colburn LLP

(57) ABSTRACT

A transport refrigeration system includes a transport refrigeration unit having a refrigerant circuit through which a refrigerant is circulated in heat exchange relationship with air drawn from a cargo box, a fuel-fired engine for powering the refrigeration unit and having an exhaust system through which exhaust gases generated by the engine are discharged and an engine coolant circuit, an engine exhaust gases to engine coolant heat exchanger, and an engine coolant circuit to refrigeration unit heat exchanger.

5 Claims, 4 Drawing Sheets

(51) Int. Cl.
  *F25B 47/02* (2006.01)
  *F25B 25/00* (2006.01)
  *F25B 27/00* (2006.01)
  *F25B 27/02* (2006.01)
  *F25B 40/00* (2006.01)
  *F25B 40/02* (2006.01)
  *B60H 1/32* (2006.01)

(52) U.S. Cl.
  CPC ......... *B60H 1/3232* (2013.01); *F25B 25/005* (2013.01); *F25B 27/00* (2013.01); *F25B 27/02* (2013.01); *F25B 40/00* (2013.01); *F25B 40/02* (2013.01); *F25B 47/02* (2013.01); *F25B 47/022* (2013.01); *F25B 2327/001* (2013.01); *F25B 2400/0403* (2013.01)

(56) References Cited

U.S. PATENT DOCUMENTS

| | | | |
|---|---|---|---|
| 5,020,320 A * | 6/1991 | Talbert | F24D 15/04 237/2 B |
| 5,099,651 A | 3/1992 | Fischer | |
| 5,598,718 A | 2/1997 | Freund et al. | |
| 5,860,594 A * | 1/1999 | Reason | B60H 1/3232 165/291 |
| 6,148,627 A | 11/2000 | Reason et al. | |
| 2009/0011288 A1 | 1/2009 | Perry et al. | |
| 2009/0013705 A1 | 1/2009 | Nishikawa et al. | |

FOREIGN PATENT DOCUMENTS

| | | |
|---|---|---|
| EP | 1628101 A2 | 2/2006 |
| EP | 1677051 A2 | 7/2006 |

* cited by examiner

TRANSPORT REFRIGERATION SYSTEM UTILIZING ENGINE WASTE HEAT

CROSS-REFERENCE TO RELATED APPLICATION

Reference is made to and this application claims priority from and the benefit of U.S. Provisional Application Ser. No. 61/538,295, filed Sep. 23, 2011, and entitled TRANSPORT REFRIGERATION SYSTEM UTILIZING ENGINE WASTE HEAT, which application is incorporated herein in its entirety by reference.

BACKGROUND OF THE INVENTION

This invention relates generally to transport refrigeration systems for mobile refrigerated cargo systems and, more particularly, to a transport refrigeration system utilizing engine heat and exhaust heat as source heat.

Refrigerated trucks and trailers and intermodal containers, collectively mobile refrigeration systems, are commonly used to transport perishable cargo, such as, for example, produce, meat, poultry, fish, dairy products, cut flowers, and other fresh or frozen perishable products. In the case of refrigerated trucks, a transport refrigeration system is mounted to the truck, typically behind the truck or on the roof of the truck for maintaining a controlled temperature environment within the cargo box within the truck. In the case of refrigerated trailers, which are typically pulled behind a tractor cab, a transport refrigeration system is mounted to the trailer, typically to the front wall of the trailer for maintaining a controlled temperature environment within the cargo box of the trailer.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo box by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

On commercially available transport refrigeration systems used in connection with refrigerated trucks and refrigerated trailers, the compressor, and typically other components of the transport refrigeration unit, must be powered during transit by an onboard engine. In the case of refrigerated trailers, the engine typically comprises a diesel engine carried on and considered part of the transport refrigeration system. In mechanically driven transport refrigeration systems the compressor is directly driven by the diesel engine, either through a direct mechanical coupling or a belt drive. An all electric transport refrigeration system for refrigerated trailer application is also commercially available through Carrier Corporation, headquartered in Farmington, Conn., USA. In the all electric transport refrigeration system, the engine, again most commonly a diesel engine, carried on and considered part of the transport refrigeration system, drives an onboard AC synchronous generator that generates AC power. The generated AC power is used to power an electric compressor motor for driving the refrigerant compressor of the transport refrigeration unit.

As noted previously, transport refrigeration systems are provided in connection with mobile refrigeration systems for maintaining a controlled temperature environment within the refrigerated cargo space, such as for example the cargo box of the trailer or truck. Although the refrigeration unit is generally operated in a cooling mode to maintain the temperature within the cargo box at a desired temperature for the product stowed in the cargo box, it may be necessary to actually heat the air within the cargo box particularly in cooler climates and for certain produce. Generally, it is also necessary to heat the evaporator coil to melt frost from the outside surface of the evaporator coil. Therefore, the refrigeration unit may be designed for operation in a heating mode and a defrost mode wherein hot refrigerant vapor is directed from the compressor discharge directly to and through the evaporator coil to heat box air passed through the evaporator by the evaporator fan. Alternatively, an electric resistance heater may be provided in proximity to the evaporator coils that may be selectively activated to heat the box air passing through the evaporator or to melt frost off the evaporator coil.

Although both of the aforementioned systems perform well in heating the circulating cargo box air and in defrosting the evaporator coil, both systems require operation of the engine to either drive the compressor for circulating hot refrigerant vapor through the evaporator coil or to drive a generator for producing the electric power to operate the resistance heater, which increases the shaft load on the engine during operation of the refrigeration unit in the heating mode.

SUMMARY OF THE INVENTION

A transport refrigeration system and method for controlling a temperature associated with a mobile refrigerated cargo box are provided for selectively heating cargo box air and/or defrosting the evaporator coil without increasing shaft load on the engine.

The transport refrigeration system includes a transport refrigeration unit having a refrigerant circuit through which a refrigerant is circulated in heat exchange relationship with air drawn from the cargo box, a fuel-fired engine for powering the refrigeration unit and having an exhaust system through which exhaust gases generated by the engine are discharged, an engine coolant circuit, an engine exhaust gases to engine coolant heat exchanger, and an engine coolant circuit to refrigeration unit heat exchanger. The transport refrigeration system may also include an engine coolant heat exchanger, i.e. radiator, wherein engine coolant passes in heat exchange relationship with ambient air.

In an embodiment, the engine exhaust gases to engine coolant heat exchanger includes a first heat exchanger having an engine coolant pass interdisposed in the engine coolant circuit and disposed in a gas-side pass for passing engine coolant in heat exchange relationship with a flow of engine exhaust gases passing through the gas-side pass, whereby the engine coolant absorbs heat from the engine exhaust gases and the engine exhaust gases are cooled. In an embodiment, the engine coolant circuit to refrigeration unit heat exchanger includes a second heat exchanger having an engine coolant pass interdisposed in the engine coolant circuit and disposed in an airside pass for passing engine coolant in heat exchange relationship with a flow of box air passing through the airside pass, whereby the flow of box air absorbs heat from the engine coolant and the engine coolant is cooled. In an embodiment, the engine coolant circuit to refrigeration unit heat exchanger includes a second heat exchanger having a refrigerant pass interdisposed in the refrigerant circuit and an engine coolant pass interdisposed in the engine coolant circuit, the refrigerant pass and the engine coolant pass arranged in heat exchange relationship.

The transport refrigeration system may also include an engine coolant distribution valve disposed in the engine coolant circuit with an inlet port receiving engine coolant and with a first outlet port in flow communication with the engine coolant pass of the radiator and a second outlet in flow communication with an engine coolant pass of the engine coolant circuit to refrigeration unit heat exchanger. The transport refrigeration system may further include a controller for selectively positioning the engine coolant distribution valve in one of a first position wherein the inlet port is in flow communication with the first outlet port only and a second position wherein the inlet port is in flow communication with the second outlet port only. The controller may be configured to position the engine coolant distribution valve in the first position when the refrigeration unit is operating in a cooling mode. The controller may be configured to position the engine coolant distribution valve in the second position when the refrigeration unit is operating in a heating mode for controlling a temperature associated with a mobile refrigerated cargo box. The controller may be configured to position the engine coolant distribution valve in the second position when the refrigeration unit is operating in a defrost mode for melting frost off an evaporator heat exchanger.

In a further aspect, a transport refrigeration system is provided for controlling a temperature associated with a mobile refrigerated cargo box that includes a refrigeration unit having a refrigerant circuit through which a refrigerant is circulated and passed through a refrigerant heat rejection heat exchanger in heat exchange relationship with ambient air, expanded and then passed through a refrigerant heat absorption heat exchanger in heat exchange relationship with air drawn from the cargo box, a fuel-fired engine for powering the refrigeration unit, and an engine coolant circuit having a engine coolant pass disposed in operative association with the refrigerant heat rejection heat exchanger. The transport refrigeration unit may further include an engine coolant flow diversion valve having an inlet port, a first outlet port and a second outlet port. The engine coolant flow diversion valve may be disposed in the engine coolant circuit with the inlet port receiving engine coolant and with the first outlet port in flow communication with a downstream portion of the engine coolant circuit so as to bypass the engine coolant pass, and with the second outlet port in flow communication with the engine coolant pass disposed in operative association with the refrigerant heat rejection heat exchanger. In an embodiment, the second outlet of the engine coolant flow diversion valve is in flow communication with an engine coolant pass of an engine exhaust gases to engine coolant heat exchanger In an embodiment, the engine coolant circuit includes an engine coolant heat exchanger having an engine coolant pass disposed in heat exchange relationship with an air flow to be passed in heat exchange relationship with the refrigerant heat rejection heat exchanger. A reversibly rotatable fan may be provided in operative association with the engine coolant heat exchanger and the refrigerant heat rejection heat exchanger, wherein the reversibly rotatable fan is selectively operable in a first rotation direction for passing ambient air first over the refrigerant heat rejection heat exchanger and then the engine coolant heat exchanger and is selectively operable in a second rotation direction for passing ambient air first over the engine coolant heat exchanger and the refrigerant heat rejection heat exchanger to improve head pressure control.

A method is disclosed for operating a transport refrigeration system operatively associated with a refrigerated cargo box of a mobile refrigerated system and having a refrigeration unit having a refrigerant circuit through which a refrigerant is circulated in heat exchange relationship with air drawn from the cargo box and a fuel-fired engine for powering the refrigeration unit having an exhaust system through which exhaust gases generated by the engine are discharged. The method includes the steps of: passing the engine coolant first in heat exchange relationship with the engine exhaust; and thereafter selectively either passing the engine coolant through a refrigeration unit heat exchanger or bypassing the refrigeration unit heat exchanger. In an embodiment, the step of bypassing the refrigeration unit heat exchanger comprises passing the engine coolant in heat exchange relationship with ambient air. In an embodiment, the method also includes the steps of: passing the engine coolant second in heat exchange relationship with a flow of air drawn from the cargo box; and passing the engine coolant third in heat exchange relationship with ambient air. In another embodiment, the method also includes the steps of: passing the engine coolant second in heat exchange relationship with a flow of refrigerant passing through the refrigerant circuit; and passing the engine coolant third in heat exchange relationship with ambient air.

In a further aspect, a method is provided for operating a transport refrigeration system operatively associated with a refrigerated cargo box of a mobile refrigerated system and having a refrigeration unit having a refrigerant circuit through which a refrigerant is circulated and passed through a refrigerant heat rejection heat exchanger in heat exchange relationship with ambient air, expanded and then passed through a refrigerant heat absorption heat exchanger in heat exchange relationship with air drawn from the cargo box, and a fuel-fired engine for powering the refrigeration unit, the engine having an exhaust system through which exhaust gases generated by the engine are discharged and an engine coolant circuit. The method includes the step of under cold ambient air conditions, passing a flow of engine coolant from the engine coolant circuit in heat exchange relationship with a flow of refrigerant passing through the refrigerant heat rejection heat exchanger. In an embodiment, the step of passing a flow of engine coolant from the engine coolant circuit in heat exchange relationship with a flow of refrigerant passing through the refrigerant heat rejection heat exchanger includes passing the flow of engine coolant in heat exchange relationship with a flow of ambient air and thereafter passing the flow of ambient air in heat exchange relationship with the flow of refrigerant passing through the refrigerant heat rejection heat exchanger.

BRIEF DESCRIPTION OF THE DRAWINGS

For a further understanding of the disclosure, reference will be made to the following detailed description which is to be read in connection with the accompanying drawings, wherein.

DETAILED DESCRIPTION OF THE INVENTION

Figure 1:
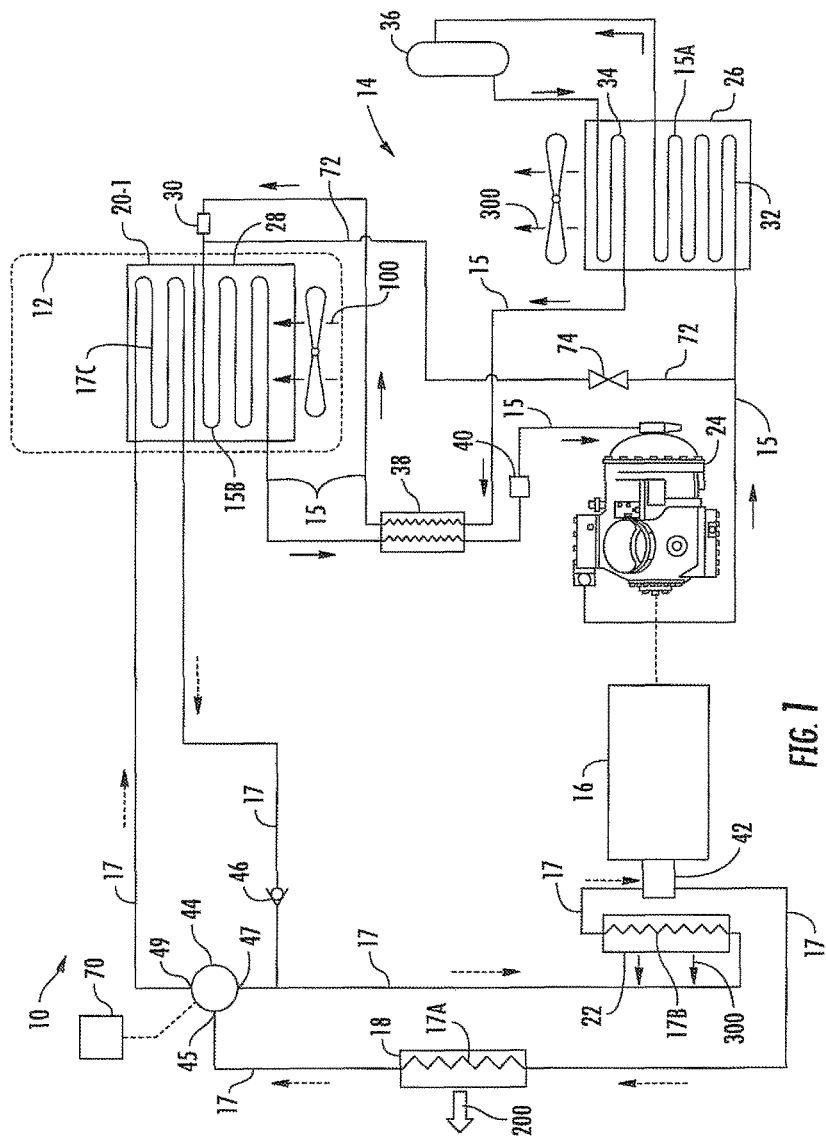
FIG. 1 is a schematic diagram illustrating an exemplary embodiment of a transport refrigeration system including an engine coolant to box air heat exchanger in accord with an aspect of the transport refrigeration system disclosed herein.

There are depicted in FIGS. 1-4 exemplary embodiments of a transport refrigeration system 10 as disclosed herein for controlling a temperature associated with a mobile refrigerated cargo box 12. The transport refrigeration unit 14 has a refrigerant circuit 15 through which a refrigerant is circulated in heat exchange relationship with air 100 drawn from the cargo box 12. The transport refrigeration system 10 includes the transport refrigeration unit (TRU) 14, a fuel-fire engine 16 for powering TRU 14, and an engine coolant circuit 17. The engine 16 has an exhaust system through which exhaust gases 200 generated by the engine are discharged. Each of the depicted embodiments of the transport refrigeration system 10 further includes an engine exhaust gases to engine coolant heat exchanger 18, an engine coolant circuit to refrigeration unit heat exchanger 20, and an engine coolant to ambient air heat exchanger (i.e. radiator) 22.

TRU 14 may be operated to establish and regulate a desired product storage temperature within the refrigerated cargo box 12 wherein a perishable product is stored during transport and to maintain the product storage temperature within a specified temperature range. The refrigerated cargo box 12 may be the cargo box of a trailer, a truck, an intermodal container or other mobile refrigerated system wherein perishable cargo, such as, for example, produce, meat, poultry, fish, dairy products, cut flowers, and other fresh or frozen perishable products, is stowed for transport.

TRU 14 includes a refrigerant compression device 24, a refrigerant heat rejection heat exchanger 26, a refrigerant heat absorption heat exchanger 28 and an expansion device 30 connected in refrigerant flow communication in a closed loop refrigerant circuit 15 and arranged in a conventional refrigeration cycle with the expansion device 30, which may for example be a thermostatic expansion valve, an electronic expansion valve or other expansion device, disposed in refrigerant circuit 15 upstream with respect to refrigerant flow of the refrigerant heat absorption heat exchanger 28. The refrigeration unit 14 also includes one or more fans associated with the refrigerant heat rejection heat exchanger 26 and one or more fans associated with the refrigerant heat absorption heat exchanger 28. TRU 14 may also include a receiver 36, a refrigerant to refrigerant heat exchanger 38 and a suction modulation valve 40 interdisposed in refrigerant circuit 15, for example, as depicted in FIGS. 1-4. It is to be understood that other components (not shown) may be incorporated into the refrigerant circuit as desired, including for example, but not limited to, a filter/dryer, a quench valve, an economizer circuit and various temperature sensors and pressure sensors as customary in conventional practice.

The refrigerant heat rejection heat exchanger 26 includes a refrigerant pass 15A that may, for example, comprise one or more refrigerant conveying coiled tubes or one or more tube banks formed of a plurality of refrigerant conveying tubes extending between respective inlet and outlet manifolds. The associated fan(s) are operative to pass air, typically ambient air 300, across the tubes of the refrigerant heat rejection heat exchanger 26 to cool refrigerant vapor passing through the refrigerant pass 15A. The refrigerant heat rejection heat exchanger 26 may operate either as a refrigerant condenser, such as if TRU 14 is operating in a subcritical refrigerant cycle or as a refrigerant gas cooler, such as if TRU 14 is operating in a transcritical cycle. In the depicted embodiments, the refrigerant pass 15A of the refrigerant heat rejection heat exchanger 26 includes a condenser coil 32 and a subcooler coil 34 disposed in series refrigerant flow relationship.

The refrigerant heat absorption heat exchanger 28 includes a refrigerant pass 15B that may, for example, also comprise one or more refrigerant conveying coiled tubes or one or more tube banks formed of a plurality of refrigerant conveying tubes extending between respective inlet and outlet manifolds. The associated fan(s) are operative to pass air 100 drawn from the cargo box 12 across the tubes of the refrigerant heat absorption heat exchanger 28 to heat and evaporate refrigerant liquid passing through the refrigerant pass 15B and cool the air. The air cooled in traversing the refrigerant heat rejection heat exchanger 28, which may also be referred to herein as an evaporator, is supplied back to the temperature controlled cargo box. It is to be understood that the term "air" when used herein with reference to the atmosphere within the cargo box 12 includes mixtures of air with other gases, such as for example, but not limited to, nitrogen or carbon dioxide, sometimes introduced into a refrigerated cargo box for transport of perishable produce.

The refrigerant compression device 24 may comprise a single-stage or multiple-stage compressor such as, for example, a reciprocating compressor, as depicted in FIGS. 1-4, or a scroll compressor. The compression device 24 receives at a suction inlet refrigerant vapor at a suction pressure and suction temperature from the refrigerant circuit 15, compresses the refrigerant vapor through a compression mechanism (not shown) to a higher discharge pressure and a discharge temperature, and returns the refrigerant vapor at the higher pressure and temperature through a discharge to the refrigerant circuit 15 to circulate therethrough. The compression mechanism of the compression device 24 may be driven by the engine 16 through a direct mechanical coupling to the engine drive shaft as depicted schematically in FIGS. 1-4, or may be driven by an electric motor powered with electric power generated on board through an electric generator (not shown) driven by the engine 16.

In the exemplary embodiments depicted in FIGS. 1-4, the transport refrigeration system 10 includes an engine coolant circuit 17 including an engine exhaust to engine coolant heat exchanger 18, an engine coolant circuit to refrigeration unit heat exchanger 20, an engine coolant to ambient air heat exchanger (i.e. radiator) 22, an engine coolant system 42 and an engine coolant distribution valve 44. The engine coolant system 42 includes an internal engine cooling circuit (not shown) and a coolant pump (not shown) for circulating the engine coolant through the engine coolant circuit including the internal engine cooling circuit.

The engine exhaust to engine coolant heat exchanger 18 includes an engine coolant pass 17A interdisposed in the engine coolant circuit 17 and disposed in a gas-side pass through which the engine exhaust gases 200 flow. Engine coolant flows through the engine coolant pass 17A in heat exchange relationship with the engine exhaust gases 200 whereby the engine coolant absorbs heat from the engine exhaust gases and the engine exhaust gases are cooled.

The engine coolant to ambient air heat exchanger 22 includes an engine coolant pass 17B interdisposed in the engine coolant circuit 17 and disposed in a flow of ambient air 300 generated by a radiator fan (not shown) operatively associated with the engine coolant to ambient air heat exchanger 22. Engine coolant flows through the engine coolant pass 17B in heat exchange relationship with the ambient air 300 whereby the engine coolant is cooled before the being passed through the internal engine cooling circuit.

In the embodiment depicted in FIG. 1, the engine coolant circuit to refrigeration unit heat exchanger 20 includes a heat exchanger 20-1 having an engine coolant pass 17C interdisposed in the engine coolant circuit 17 and disposed in an airside pass for passing engine coolant in heat exchange relationship with a flow of box air 100 passing through the airside pass, whereby the flow of box air absorbs heat from the engine coolant and the engine coolant is cooled. In the embodiment depicted in FIG. 2, the engine coolant circuit to refrigeration unit heat exchanger 20 includes a heat exchanger 20-2 having a refrigerant pass 15C interdisposed in the refrigerant circuit 15 and an engine coolant pass 17D interdisposed in the engine coolant circuit 17. The refrigerant pass 15C and the engine coolant pass 17D are arranged in heat exchange relationship whereby the refrigerant passing through the refrigerant circuit 15 flows through the refrigerant pass 15C and absorbs heat from the engine coolant flowing through the engine coolant pass 17D and the engine coolant is cooled.

The transport refrigeration system 10 may also include an engine coolant distribution valve 44 disposed in the engine coolant circuit 17 with an inlet port 45 receiving engine coolant and with a first outlet port 47 in flow communication through a first downstream branch of the engine coolant circuit 17 with the engine coolant pass 17B of the engine coolant to ambient air heat exchanger 22 and a second outlet 49 in flow communication through a second downstream branch of the engine coolant circuit 17 with an engine coolant pass (17C in FIG. 1, 17D in FIG. 2) of the engine coolant circuit to refrigeration unit heat exchanger 20-1, 20-2. The engine coolant distribution valve 44 is selectively positionable in one of a first position wherein the inlet port 45 is in flow communication with the first outlet port 47 only and a second position wherein the inlet port 45 is in flow communication with the second outlet port 49 only.

The transport refrigeration system 10 may also include a controller 70 for selectively positioning the engine coolant distribution valve 44 in either the first position or the second position. The controller 70 may be configured to position the engine coolant distribution valve 44 in the first position when TRU 14 is operating in a cooling mode for controlling a temperature associated with the mobile refrigerated cargo box 12. The controller 70 may be configured to position the engine coolant distribution valve 44 in the second position when TRU 14 is operating in a heating mode for controlling a temperature associated with the mobile refrigerated cargo box 12. Additionally, in the embodiment depicted in FIG. 2, the controller 70 may be configured to position the engine coolant distribution valve 44 in the second position when TRU 14 is operating in a defrost mode for melting frost off external surface of the evaporator heat exchanger 28.

In operation of the transport refrigeration system 10, engine coolant having traversed the internal engine cooling circuit leaves the engine cooling system 42 and is circulated by the engine coolant pump (not shown) through the engine coolant circuit 17, first passing through the engine coolant pass 17A of the engine coolant exhaust heat exchanger 18 and thence passing to the inlet port 45 of the engine coolant distribution valve 44. If the engine coolant distribution valve 44 is positioned in its first position, the engine coolant passes from the inlet port 45 to the first outlet port 47 and into the first downstream branch of the engine coolant circuit 17 and thence through the engine coolant pass 17B of the engine coolant to ambient air heat exchanger (radiator) 22 and back to the engine cooling system 42. To prevent back flow of the engine coolant into the engine coolant to refrigerant unit heat exchanger 20-1, 20-2 when the engine coolant distribution valve 44 is positioned in its first position, a check valve 46 may be interdisposed in the second downstream branch of the engine coolant circuit 17 downstream of the engine coolant pass 17C, 17D of the engine coolant to refrigeration unit heat exchanger 20-1, 20-2 and upstream of the intersection with the first downstream branch of the engine coolant circuit 17.

However, if the engine coolant distribution valve 44 is positioned in its second position, the engine coolant passes from the inlet port 45 to the second outlet port 49 and into the second downstream branch of the engine coolant circuit 17 and thence to and through the engine coolant pass 17C, 17D of the engine coolant to refrigerant unit heat exchanger 20 (20-1 in FIGS. 1, 3 and 4; 20-2 in FIG. 2) and thence through the engine coolant pass 17B of the engine coolant to ambient air heat exchanger 22 and back to the engine cooling system 42.

A method for operating the transport refrigeration system 10 operatively associated with the refrigerated cargo box 12 includes the steps of first passing the engine coolant in heat exchange relationship with the engine exhaust in the engine coolant to engine exhaust heat exchanger 18; and thereafter selectively either passing the engine coolant through the engine coolant to refrigeration unit heat exchanger 20 or bypassing the engine coolant to refrigeration unit heat exchanger 20. In an embodiment, the step of bypassing the engine coolant to refrigeration unit heat exchanger 20 comprises passing the engine coolant in heat exchange relationship with ambient air in the engine coolant radiator 22. In an embodiment, the method also includes the steps of: passing the engine coolant second in heat exchange relationship with a flow of air drawn from the cargo box in the engine coolant to refrigeration unit heat exchanger 20-1; and passing the engine coolant third in heat exchange relationship with ambient air in the engine coolant radiator 22. In another embodiment, the method also includes the steps of: passing the engine coolant second in heat exchange relationship with a flow of refrigerant passing through the engine coolant to refrigerant heat exchanger 20-2; and passing the engine coolant third in heat exchange relationship with ambient air in the engine coolant radiator 22.

Figure 3:
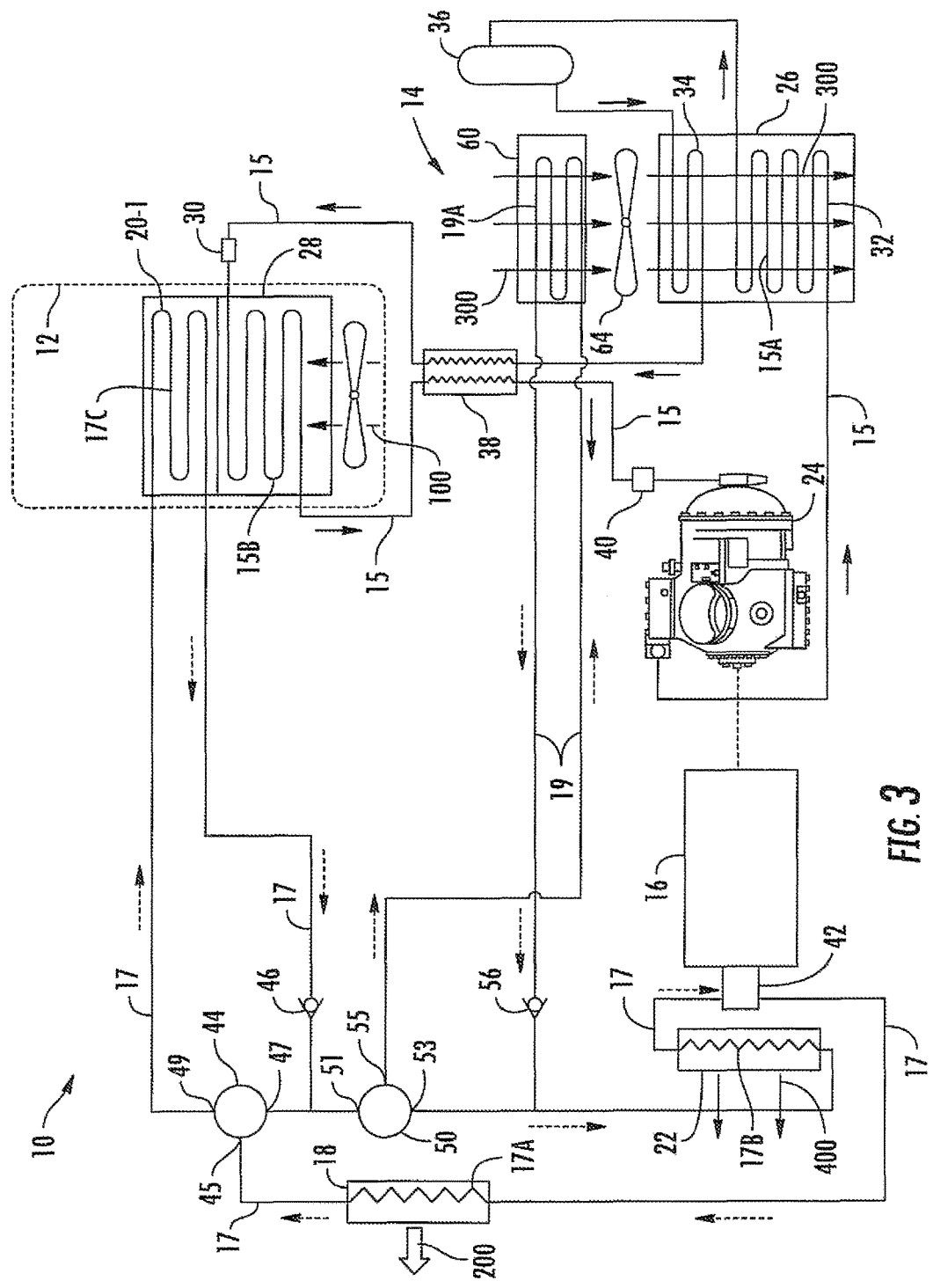
FIG. 3 is a schematic diagram illustrating an exemplary embodiment of a transport refrigeration system including an engine coolant to refrigerant heat exchanger in accord with still another aspect of the transport refrigeration system disclosed herein.
Figure 4:
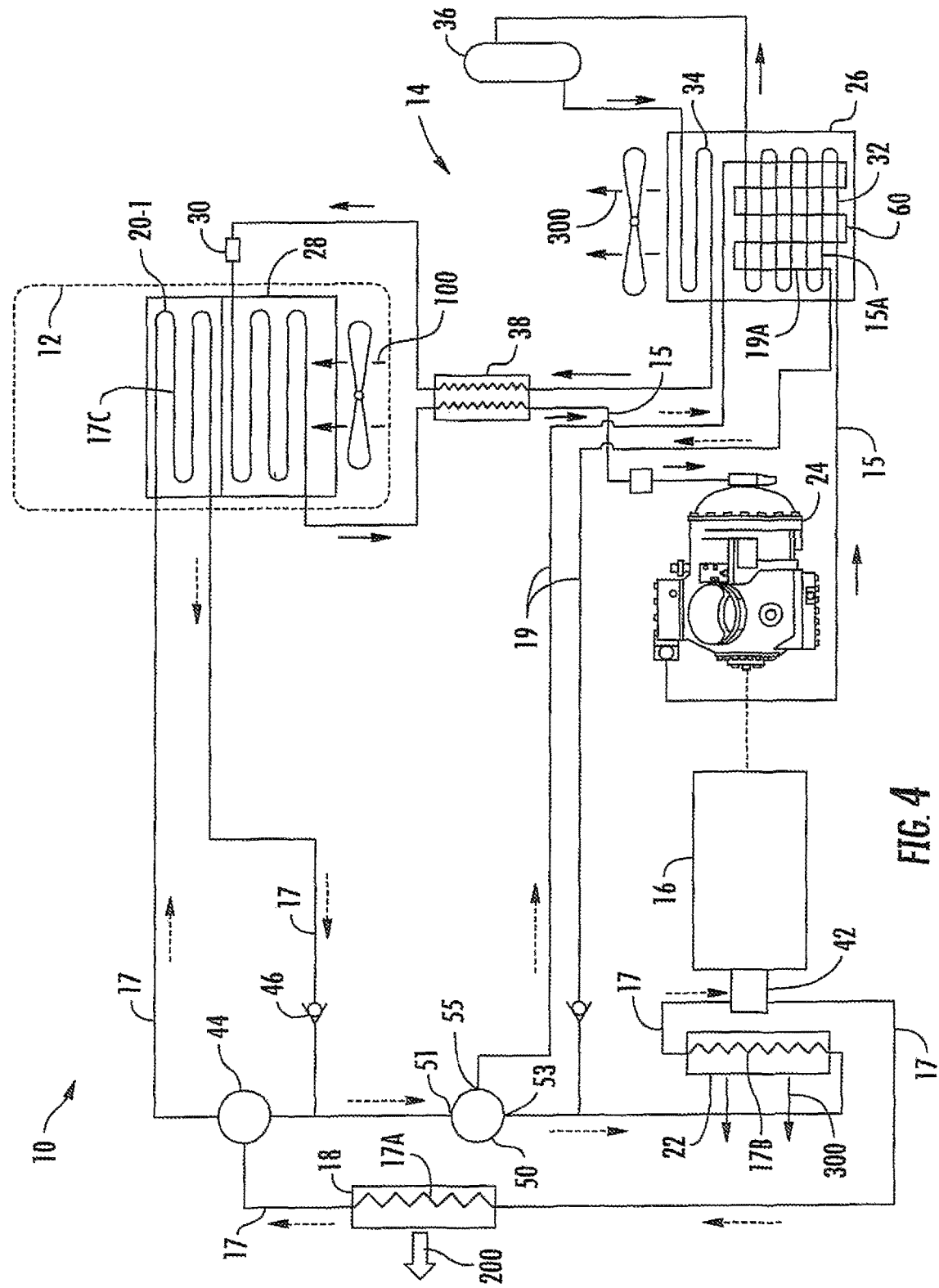
FIG. 4 is a schematic diagram illustrating an exemplary embodiment of a transport refrigeration system including an engine coolant to refrigerant heat exchanger in accord with a further aspect of the transport refrigeration system disclosed herein.

Referring now to FIGS. 3 and 4, in the embodiments depicted therein, the transport refrigeration system 10 includes an engine coolant circuit 19 having an engine coolant pass 19A disposed in operative association with the refrigerant heat rejection heat exchanger 26. In the embodiment depicted in FIG. 3, the engine coolant circuit 19 includes an engine coolant heat exchanger 60 wherein the engine coolant pass 19A is disposed in heat exchange relationship with the ambient air flow 300 prior to the air flow 300 passing in heat exchange relationship with refrigerant flowing through the refrigerant pass 15A of the refrigerant heat rejection heat exchanger 26. In the embodiment depicted in FIG. 4, the engine coolant pass 19A of the engine coolant circuit 19 comprises an engine coolant heat exchanger 60 disposed in heat exchange relationship with the refrigerant heat rejection heat exchanger 26, whereby heat is transferred directly from the engine coolant flowing through the engine coolant pass 19A to the refrigerant flowing through the refrigerant heat rejection heat exchanger 26.

Referring again to the embodiment depicted in FIG. 3, a reversibly rotatable fan 64 may be provided in operative association with the engine coolant heat exchanger 60 and the refrigerant heat rejection heat exchanger 26. The reversibly rotatable fan 64 is selectively operated in a first rotation direction for passing a flow of ambient air 300 first over the refrigerant heat rejection heat exchanger 26 and then the engine coolant heat exchanger 60, such as, for example when the refrigeration unit 14 is operating in a cooling mode under normal ambient conditions. However, when the refrigeration unit 14 is operating is a cooling mode under cold ambient conditions, the reversibly rotatable fan 64 may be selectively operated in a second rotation direction for passing the flow of ambient air 300 first over the engine coolant pass 19A of the engine coolant heat exchanger 60 and then the refrigerant heat rejection heat exchanger 26, as illustrated in FIG. 3. In passing first over the engine coolant pass 19A, the cold ambient air is preheated prior to passing in heat exchange relationship with the refrigerant passing through the refrigerant pass of the refrigerant heat rejection heat exchanger 26.

In the embodiments depicted in FIGS. 3 and 4, the engine coolant circuit 19 is shown incorporated into the transport refrigeration system 10 of FIG. 1 as a branch engine coolant circuit 19 off the engine coolant circuit 17. To incorporate the branch engine coolant line 19 into the engine coolant circuit 17, the transport refrigeration system 10 may further include an engine coolant flow diversion valve 50 having an inlet port 51, a first outlet port 53 and a second outlet port 55. The engine coolant flow diversion valve 50 is interdisposed in the engine coolant circuit with the inlet port 51 receiving engine coolant from an upstream portion of the engine coolant circuit 17 and with the first outlet port 53 in flow communication with a downstream portion of the engine coolant circuit 17 and the second outlet port 55 in flow communication with the engine coolant pass 19A disposed in operative association with the refrigerant heat rejection heat exchanger 26.

The engine coolant flow diversion valve 50 may be selectively positioned in a first position wherein the first inlet port 51 is in flow communication with the first outlet port 53 only and may be selectively positioned in a second position wherein the first inlet port 51 is in flow communication with the second outlet port 55 only. The branch engine coolant circuit 19 taps back into the engine coolant circuit 17 upstream of the engine coolant pass 17B of the engine coolant to ambient air heat exchanger 22. When the engine coolant flow diversion valve 50 is positioned in the second position, engine coolant flows from the engine coolant circuit 17 through the inlet port 51, to and through the second outlet port 55 into the upstream leg of the branch engine coolant circuit 19, thence through the engine coolant pass 19A and then passes through the downstream leg of the branch engine coolant circuit 19 to return to the engine coolant circuit 17.

When the engine coolant flow diversion valve 50 is positioned in the first position, engine coolant flows from the engine coolant circuit 17 through the inlet port 51, to and through the first outlet port 53 and into the engine coolant circuit 17 thereby bypassing the engine coolant circuit 19 and the engine coolant pass 19A disposed in operative association with the refrigerant heat rejection heat exchanger 26. In the embodiments depicted in FIGS. 3 and 4, the engine coolant flow diversion valve 50 is interdisposed in the engine coolant circuit 17 upstream of the engine exhaust gases to engine coolant heat exchanger 18, whereby the first outlet port 53 of the engine coolant flow diversion valve 50 is in flow communication with the engine coolant pass 17A of an engine exhaust gases to engine coolant heat exchanger 18. To prevent back flow of the engine coolant into the engine coolant pass 19 when the engine coolant flow diversion valve 50 is positioned in its first position, a check valve 56 may be interdisposed in the second downstream leg of the branch engine coolant circuit 19 downstream of the engine coolant pass 19A and upstream of the intersection with the engine coolant circuit 17.

In a further aspect of the disclosure, a method is provided for operating a transport refrigeration system 10 operatively associated with a refrigerated cargo box 12 of a mobile refrigerated system during cold ambient conditions. The refrigeration system 10 includes refrigeration unit 14 having a refrigerant circuit 15 through which a refrigerant is circulated and passed through a refrigerant heat rejection heat exchanger 26 in heat exchange relationship with ambient air 300, expanded and then passed through a refrigerant heat absorption heat exchanger 28 in heat exchange relationship with air drawn from the cargo box 12, and a fuel-fired engine 16 for powering the refrigeration unit, the engine 16 having an exhaust system through which exhaust gases generated by the engine are discharged, and an engine coolant circuit 17. The method includes the step of under cold ambient air conditions, passing a flow of engine coolant from the engine coolant circuit 17 through the branch engine coolant circuit 19 in heat exchange relationship with a flow of refrigerant passing through the refrigerant heat rejection heat exchanger 26. In an embodiment, the step of passing a flow of engine coolant from the engine coolant circuit 17 in heat exchange relationship with a flow of refrigerant passing through the refrigerant heat rejection heat exchanger 26 includes passing the flow of engine coolant through the engine coolant pass 19A of the branch engine coolant circuit 19 in heat exchange relationship with a flow of ambient air 300 and thereafter passing the flow of ambient air 300 in heat exchange relationship with the flow of refrigerant passing through the refrigerant pass 15A of refrigerant heat rejection heat exchanger 26.

In a further aspect of the method disclosed herein, the engine coolant may be passed through the engine coolant pass 17A of the engine exhaust gases to engine coolant heat exchanger 18 in heat exchange relationship with the engine exhaust gases to heat the engine coolant during operation of the engine 16 during cold ambient conditions. Heating the engine coolant, to a temperature less than 250° F. (121° C.), with waste heat from the engine exhaust gases during cold ambient conditions serves to keep the engine operating warmer and more fuel efficiently under cold ambient conditions, and also reduces the temperature of the exhaust gases.

In accord with an aspect of the system and method disclosed herein, waste heat from the engine 16, i.e. engine heat and exhaust heat, replaces electric resistance heat and hot refrigerant vapor as the source of heat when the transport refrigeration unit 14 is operating in a box air heating mode, thus reducing engine shaft load when heat is required by the transport refrigeration unit 14. As a result, overall engine efficiency is increased. Additionally, utilizing the engine waste heat as the heat source for the transport refrigeration unit 14 boosts the available heating capacity for operation in the heating mode. Further, absorbing heat from the engine exhaust gases reduces the temperature of the engine exhaust gases downstream of the engine exhaust to engine coolant heat exchanger. For example, the temperature of the engine exhaust gases may be reduced from conventional temperatures up to 1100° F. to 1200° F. (593° C. to 649° C.) to temperatures in the range of 600° F. (316° C.). The reduction in exhaust gas temperature enables the safe use of effective diesel particulate filters to remove particulates from the cooler exhaust gases.

In the embodiment depicted in FIG. 1, a conventional hot refrigerant gas bypass line 72 and an associated flow control device 74 are provided for operation of the TRU 14 in an evaporator defrost mode. The flow control device 74 is in a normally closed position to block flow of refrigerant through the hot refrigerant gas bypass line 72, except when the TRU 14 is operating in the evaporator defrost mode, in which case the flow control device 74 is opened to permit hot refrigerant gas discharging from the compression device 24 through refrigerant line 15 to bypass the refrigerant heat rejection heat exchanger 26 and pass directly to and through the refrigerant pass 15B of the evaporator heat exchanger 28 to effectuate melting of frost deposited on the heat exchange surface of the refrigerant pass 15B.

Figure 2:
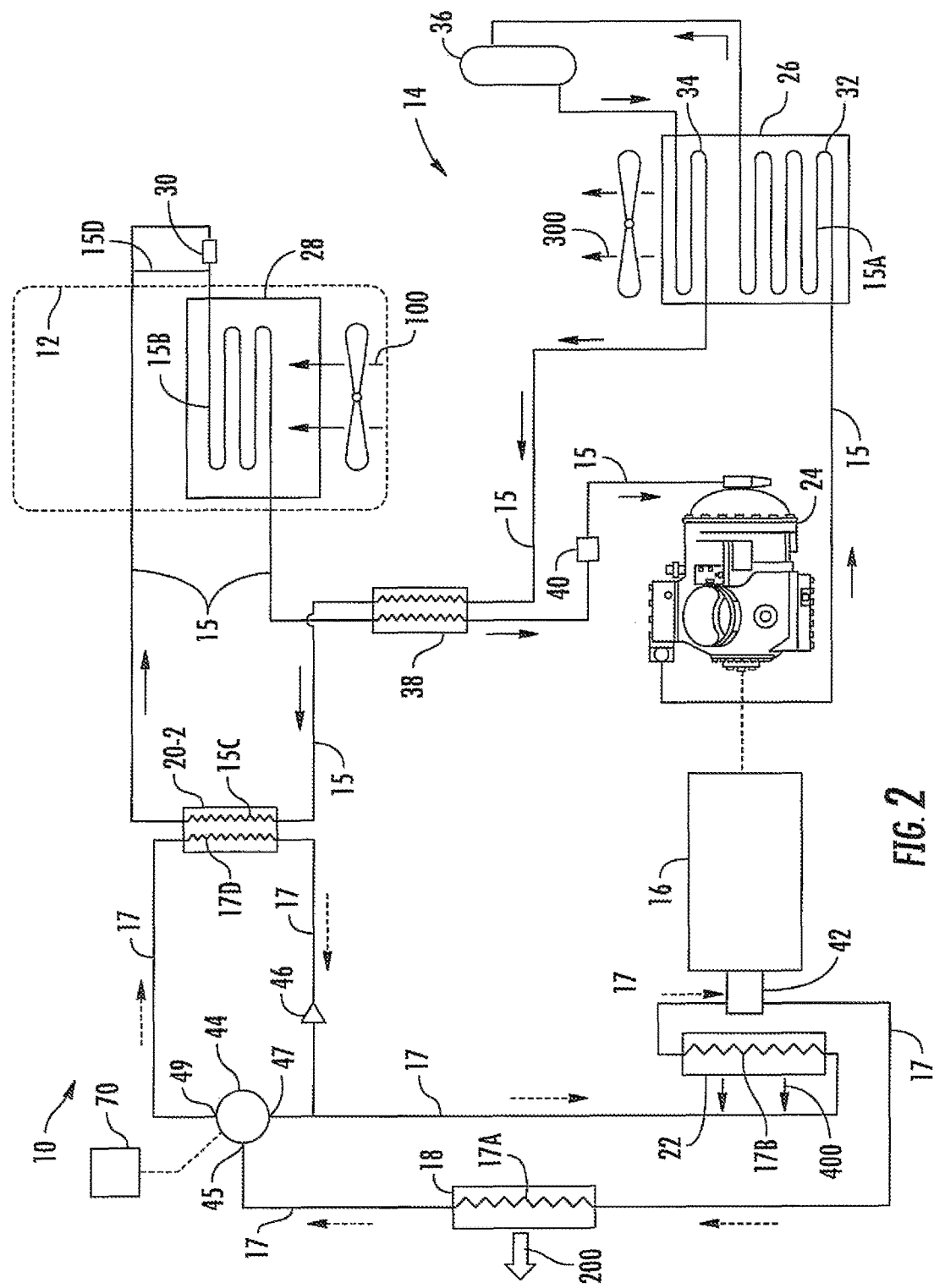
FIG. 2 is a schematic diagram illustrating an exemplary embodiment of a transport refrigeration system including an engine coolant to refrigerant heat exchanger in accord with another aspect of the transport refrigeration system disclosed herein.

However, in the embodiment depicted in FIG. 2, the engine coolant distribution valve 44 may be positioned in the second position when TRU 14 is operating in a defrost mode for melting frost off the external heat exchange surface of the evaporator heat exchanger 28. With the engine coolant distribution valve 44 positioned in the second position, hot engine coolant passes through engine coolant pass 17-D of the engine coolant to refrigerant unit heat exchanger 20-2 to heat refrigerant passing through the refrigerant pass 15C. The heated refrigerant then passes from refrigerant line 15 at a location downstream of refrigerant pass 15C and upstream of the expansion device 30 through branch 15D into and through the refrigerant pass 15B of the evaporator heat exchanger 28 to effectuate melting of frost deposited on the heat exchange surface of the refrigerant pass 15B. In this manner, engine waste heat transferred from the engine coolant to the refrigerant replaces or at least supplements the heat of the refrigerant as the source of heat when the transport refrigeration unit 14 is operating in a defrost mode, thus reducing engine shaft load when heat is required by the transport refrigeration unit 14 and boosting the available heating capacity for operation in the defrost mode.

It is to be understood that the system and method disclosed for passing engine coolant through the engine coolant pass 19A in heat exchange relationship with the refrigerant heat rejection heat exchanger 26 may be incorporated into a transport refrigeration system alone, or in combination with the engine exhaust gases to engine coolant heat exchanger 18, or in combination with both the engine exhaust gases to engine coolant heat exchanger 18 and the engine coolant to refrigerant unit heat exchanger 20, as illustrated in FIGS. 3 and 4.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A transport refrigeration system for controlling a temperature associated with a mobile refrigerated cargo box comprising:
   a refrigeration unit having a refrigerant circuit through which a refrigerant is circulated in heat exchange relationship with air drawn from the mobile refrigerated cargo box;
   a fuel-fired engine for powering the refrigeration unit, the fuel-fired engine having an exhaust system through which exhaust gases generated by the fuel-fired engine are discharged;
   an engine coolant circuit;
   an engine exhaust gases to engine coolant heat exchanger;
   an engine coolant circuit to refrigeration unit heat exchanger;
   wherein the engine exhaust gases to engine coolant heat exchanger comprises a first heat exchanger having a first engine coolant pass interdisposed in the engine coolant circuit and a gas-side pass, the first engine coolant pass disposed in the gas-side pass for passing engine coolant in heat exchange relationship with a flow of engine exhaust gases passing through the gas-side pass, whereby the first engine coolant absorbs heat from the engine exhaust gases and the engine exhaust gases are cooled;
   an engine coolant radiator wherein engine coolant passes in heat exchange relationship with ambient air;
   an engine coolant distribution valve having an inlet port, a first outlet port and a second outlet port, the engine coolant distribution valve disposed in the engine coolant circuit with the inlet port receiving the engine coolant and with the first outlet port in flow communication with a second engine coolant pass of the radiator and the second outlet in flow communication with a third engine coolant pass of the engine coolant circuit to refrigeration unit heat exchanger;
   a controller for selectively positioning the engine coolant distribution valve in one of a first position wherein the inlet port is in flow communication with the first outlet port only and a second position wherein the inlet port is in flow communication with the second outlet port only;
   wherein the controller is configured to position the engine coolant distribution valve in the second position when the refrigeration unit is in a defrost mode for melting frost off an evaporator heat exchanger.

2. The transport refrigeration system as recited in claim 1 wherein the engine coolant circuit to refrigeration unit heat exchanger comprises a second heat exchanger having a second engine coolant pass interdisposed in the engine coolant circuit and an airside pass, the second engine coolant pass disposed in the airside pass for passing the engine coolant in heat exchange relationship with a flow of box air passing through the airside pass, whereby the flow of box air absorbs heat from the engine coolant and the engine coolant is cooled.

3. The transport refrigeration system as recited in claim 2 further comprising a refrigerant evaporator heat exchanger having a refrigerant pass interdisposed in the refrigerant circuit and the airside pass, the refrigerant pass disposed in the airside pass for passing refrigerant in heat exchange relationship with the flow of box air passing through the airside pass, the refrigerant evaporator heat exchanger disposed upstream with respect to box air flow of the second heat exchanger.

4. The transport refrigeration system as recited in claim 3 wherein the second heat exchanger and the refrigerant evaporator heat exchanger are disposed in the airside pass and the refrigerant pass is disposed in the airside pass upstream with respect to the second engine coolant pass.

5. The transport refrigeration system as recited in claim 1 wherein the controller is configured to position the engine coolant distribution valve in the second position when the refrigeration is in a heating mode for controlling the temperature associated with the mobile refrigerated cargo box.

* * * * *